Aug. 26, 1969
A. BAUS ET AL
3,463,696
ARTIFICIAL-TREE CONSTRUCTION
Filed Jan. 23, 1967
2 Sheets-Sheet 1
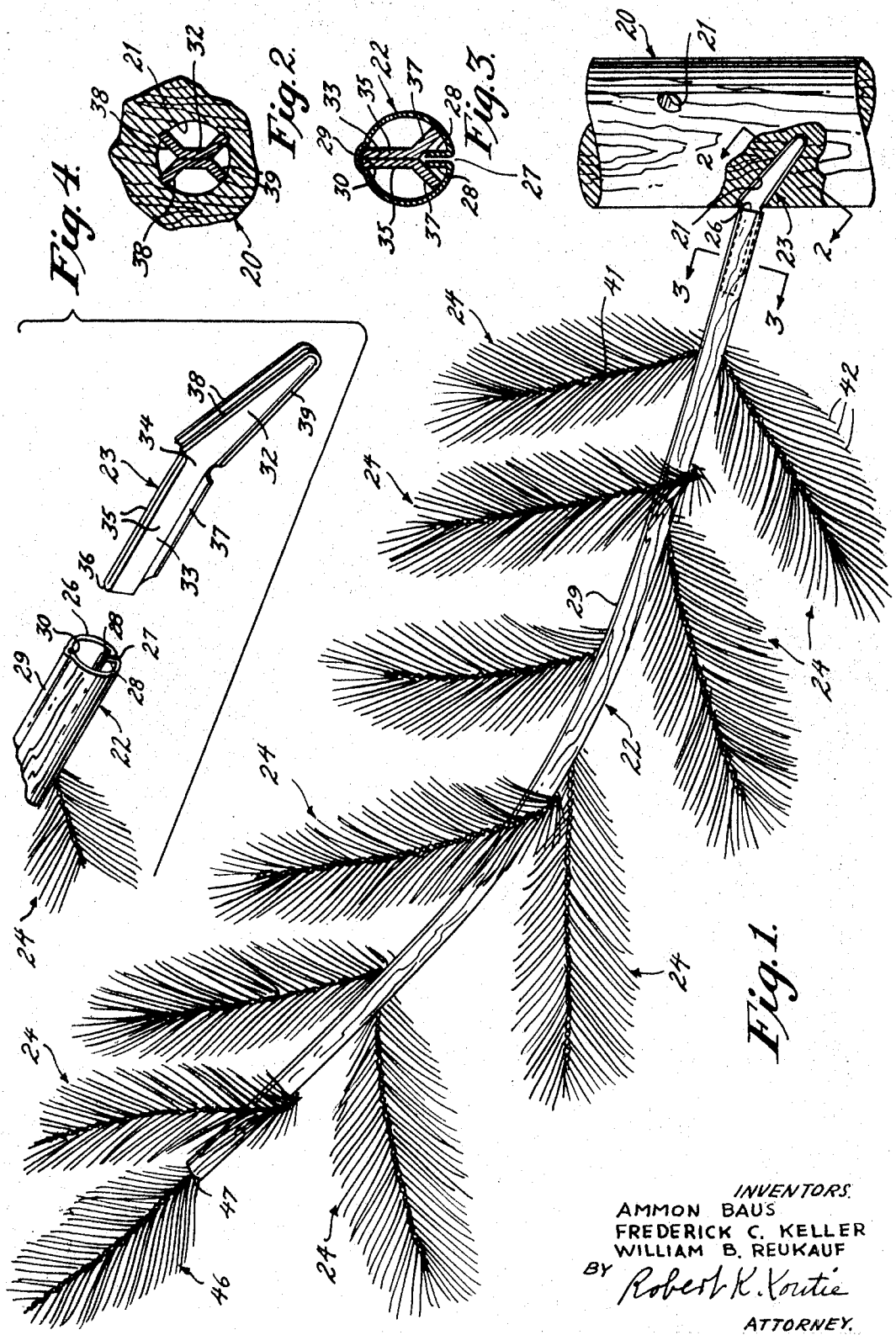
INVENTORS.
AMMON BAUS
FREDERICK C. KELLER
WILLIAM B. REUKAUF
BY Robert K. Youtie
ATTORNEY.

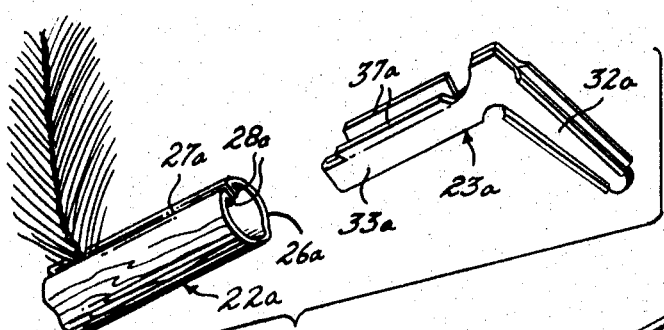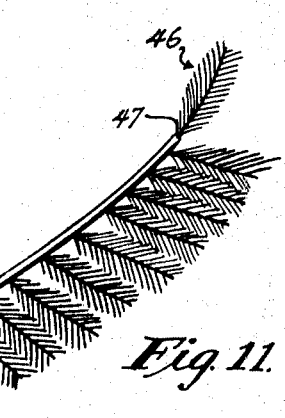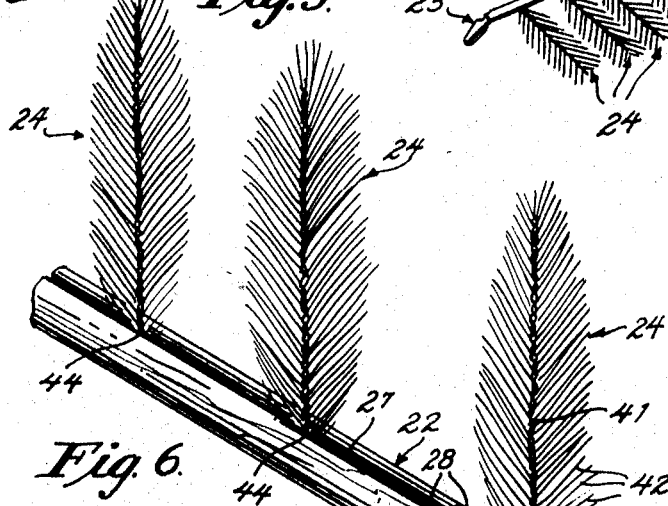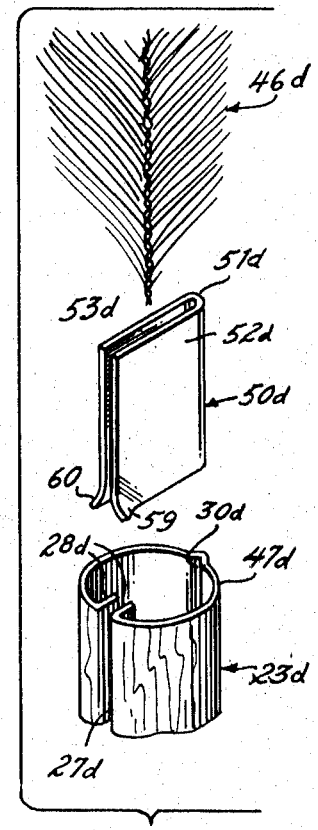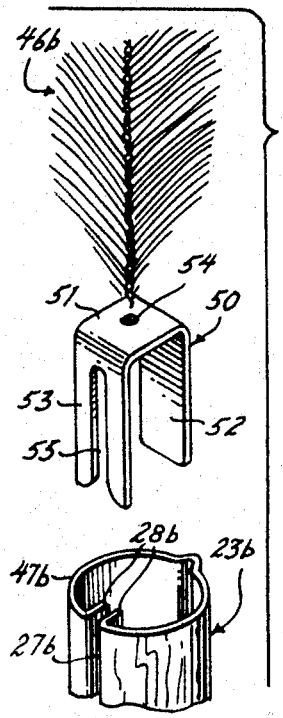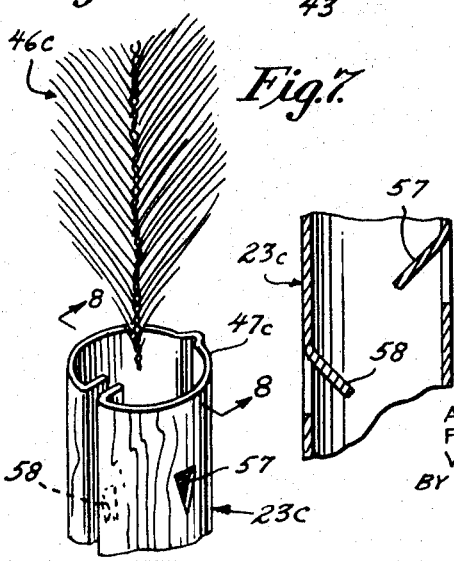

United States Patent Office 3,463,696
Patented Aug. 26, 1969

3,463,696
ARTIFICIAL-TREE CONSTRUCTION
Ammon Baus, Philadelphia, and Frederick C. Keller, Cornwells Heights, Pa., and William B. Reukauf, Haddonfield, N.J., assignors to Carey-McFall Company, Philadelphia, Pa., a corporation of Pennsylvania
Continuation-in-part of application Ser. No. 552,748, May 25, 1966. This application Jan. 23, 1967, Ser. No. 610,918
Int. Cl. A41g 1/00
U.S. Cl. 161—24       10 Claims

ABSTRACT OF THE DISCLOSURE

An artificial tree is provided having a tubular longitudinally slotted branch connected at one end to an upstanding trunk. A plurality of artificial twigs are frictionally held on the branch between a pair of lips which define the slot. A connector engages with a hole in the trunk and the hollow branch to fasten the branch to the trunk and prevents widening of the slot.

---

This application is a continuation-in-part of our copending prior application Ser. No. 552,748 filed May 25, 1966.

As is well known to those versed in the art, the production of artificial trees and plants has heretofore involved considerable manual labor, resulting in high manufacturing costs and retail prices. Prior attempts to manufacture and assemble artificial trees and plants have not been successful, as the ultimate desiderata, namely lifelike appearance, has suffered.

It is therefore an important object of the present invention to provide unique structural improvements in artificial trees and plants which enable such artificial devices to be inexpensively manufactured and assembled by massproduction techniques at considerable savings in cost, without sacrifice of the natural and lifelike appearance of the simulated plants and trees.

It is another object of the present invention to provide a unique and highly improved construction of artificial tree or plant having the advantageous characteristics mentioned in the preceding paragraph, which is extremely simple in design, capable of quick and easy assembly by the manufacturer, seller or buyer, and which is highly attractive in appearance and durable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial elevational view showing an artificial tree constructed in accordance with the teachings of the present invention, and partly broken away for clarity of understanding;

FIGURE 2 is a partial transverse sectional view taken generally along the line 2—2 of FIGURE 1;

FIGURE 3 is a partial transverse sectional view taken generally along the line 3—3 of FIGURE 1;

FIGURE 4 is a partial perspective view illustrating assembly of components in accordance with the instant invention;

FIGURE 5 is a partial perspective view similar to FIGURE 4, showing a slightly modified structure of the instant invention;

FIGURE 6 is a partial perspective view illustrating assembly of other components of the instant invention;

FIGURE 7 is a partial perspective view illustrating assembly of a branch end twig in accordance with the teachings of the present invention;

FIGURE 8 is a partial longitudinal sectional view taken generally along the line 8—8 of FIGURE 7;

FIGURE 9 is a partial perspective view illustrating another branch end assembly of the present invention;

FIGURE 10 is an exploded perspective view illustrating still another branch end construction of the instant invention; and FIGURE 11 is a perspective view illustrating a branch assembly of the present invention adapted for shipping or storage.

Referring now more particularly to the drawings, and specifically to FIGURE 1 thereof, a post or simulated tree trunk is generally designated 20, and may be fabricated of wood dowel stock, or other suitable material, advantageously formed throughout its length with a plurality of blind holes or openings 21, which may extend transversely into the post. A tube 22, simulating a branch extends transversely from the post 20, being connected to the latter by a connector 23. Projecting exteriorly from the tube 22, at spaced locations therealong, are a plurality of twigs 24.

The tube 22 is best seen in FIGURE 4, and may be of an elongate, open-ended configuration, the inner open end being shown at 26. The tube 22 may be fabricated of metal, or other suitable material, advantageously marked on its exterior surface to simulate wood, and may be rolled or otherwise formed with a longitudinally extending elongate slot 27 coextensive with the tube and opening through opposite ends thereof. Further, the slot 27 may be defined between longitudinally extending, inturned marginal edge lips or flanges 28. Diametrically opposite to the longitudinal slots 27 the tube 22 may be formed with a longitudinally coextensive externally protuberant rib or land 29. The rib or land 29 defines an internal longitudinal groove 30 in the tube 22; and, the tube may assume a longitudinally arcuate configuration, see FIGURE 1, as by conventional bending techniques.

The connector 23 is best seen in FIGURES 1–4, and is of elongate overall configuration including an end portion 32 engageable in a trunk hole 21, and an end portion 33 engageable in the inner end 26 of the tube 22. The end portions 32 and 33 of the connector 23 may be disposed in angulate relation with respect to each other and joined by a medial portion 34.

More specifically the connector 23 may be integrally fabricated of a pair of congruent metal strips 35 arranged in facing engagement with each other and integrally connected, as by a U-shaped bend or bight portion 36 at the distal or outer region of end portion 33. That is, the strips 35 are disposed in their facing engagement throughout their coextensive lengths and may be provided on their adjacent longitudinal underedges of the outer end region 33 with obliquely outstanding, longitudinally extending flanges 37. The flanges 37 are best seen in FIGURE 3. In addition, the inner end portion 32 may taper toward its distal or outer region, and the facing strips thereof are provided on their adjacent longitudinal upper edges with a pair of obliquely outstanding flanges 38. Similarly, the adjacent underedges of the inner end portion 32 are provided with obliquely outstanding longitudinal flanges 39. The flanges 38 and 39 may be seen in section in FIGURE 2. It will also there be apparent that the inner connector end region 32 is inserted in a trunk hole 21 with the flanges 38 and 39 in frictional holding engagement with the interior of the trunk hole. In FIGURE 3 it will be observed that the outer connector end portion 33 engages in the inner open end 26 of tube 22 with the connector flanges 37 engaging on opposite sides of the lips 28 to prevent excessive opening or spreading of the slot 27. Also, the upper edges of the outer connector end portion 33 may engage in the internal groove 30 of the tube 22 for proper location of the connector with respect to the tube.

In the embodiment of FIGURES 1–4 there is illustrated a branch tube 22 extending generally obliquely upward from the trunk post 20, with the tube slot 27 on the underside of the branch tube. However, it may be desired to extend the branch tube 22 downward from the trunk post 20, or to arrange the tube slot 27 on the upper side of the branch tube. Such a modification is shown in FIGURE 5, wherein a connector is generally designated 23a and is essentially similar to the connector 23, including an inner end region 32a for insertion in a trunk-post hole and an outer end region 33a for insertion in a branch tube 22a. However, the outer connector end region 33a is disposed at a more acute angle with respect to the inner connector end region 32a, and the outer connector end region is provided on its upper side with a pair of obliquely outstanding, longitudinally extending flanges 37a. The tube 22a may be formed with a longitudinally coextensive, open-ended slot 27a on its upper side, bounded by a pair of facing, spaced inturned lips or flanges 28a; and, the outer connector end region 33a is insertable through the inner open end 26a of the tube 22a with the flanges 37a on opposite sides of the lips 28a to prevent undesired spreading of the slot 27a.

Prior to assembly of the branch tube 22 with a connector 23, the twigs 24 are assembled with the tube. This assembly procedure is shown in FIGURE 6. It will there be seen that a twig 24 is formed with an angulate or bent inner end portion 40. The twigs 24 may be of any suitable construction, say having a longitudinally coextensive core 41 of wire twisted about slit strips or bristles 42. The core 41 is deformed, as by the angular bend at 43 to provide the angulate portion 40 insertable endwise into an open end 26 of the tube 22. Upon continued insertion of the inner twig portion 40, a region 44 of the twig is frictionally engaged in the tube slot 27 and held in position by the lips 28.

A plurality of twigs 24 may be so inserted and extend in generally coplanar relation transversely from the slotted side of the holding tube 22. Such a condition is shown in FIGURE 11, with a connector 23 inserted in the inner tube end, and an additional twig 46 inserted in the outer or distal tube end 47. In this condition, the branch assembly of tube 22, connector 23 and twigs 24 and 26 combine to define a substantially coplanar unit for convenience and economy of space in storage and transit. Of course, the several twigs 24 and 46 may be bent or deformed upon assembly with a trunk post 20 to assume any desired configuration.

While the end twig 46 may be simply inserted into the outer end 47 of the branch tube 22, it may be advantageous to provide holding means for holding the end twig in position. One such holding means is shown in FIGURE 9, wherein an end twig 46b is adapted to be inserted in the open outer end 47b of the branch tube 23b. The branch tube 23b may include a slot 27b opening through its outer end 47b and bounded by inturned lips 28b.

A holding member 50 is generally of U-shaped configuration, say being formed of a strip bent to define a generally rectangular bight portion 51, and a pair of facing spaced legs 52 and 53 depending from opposite sides of the bight portion. The bight portion 51 may be formed with a thru hole 54 for snugly receiving the inner end portion of twig 46b. Also, one leg 53 of the holding member 50 may be bifurcated, as by a longitudinally inwardly extending slot or cut 55 to subdivide the leg 53 into a pair of spaced furcations. Upon insertion of the holding member 50 into the outer open end 47b of branch tube 23b, the slot 55 is adapted to frictionally receive inturned lips 28b, both for retaining the holding member in the tube, and for preventing undesired spreading of the tube slot 27b.

Additional holding means is shown in FIGURES 7 and 8, where an end twig 46c has its inner end insertable into the open outer end 47c of a branch tube 23c. The branch tube 23c is provided, preferably at diametrically opposed and longitudinally spaced locations with internal points or barbs 57 and 58, which advantageously be struck out from the material of the tube 23c. By this construction the barbs 57 and 58 engage with the inserted inner end region of twig 46c to effectively retain the latter in the tube 23c.

An additional form of end-twig holding means is shown in FIGURE 10, wherein a holding member 50d is insertable into the open end 47d of a branch tube 23d having a longitudinally coextensive, open-ended slot 27d bounded by inturned lips 28d.

The holding member 50d may be defined by a generally U-shaped plate having a pair of facing spaced leg portions 52d and 53d connected together by an arcuate bight portion 51d. The facing leg portions 52d and 53d are spaced to frictionally receive and retain the inner end portion of a twig 46d, while the holding member 50d is insertable into the open end 47d of branch tube 23d with the bight portion 51d engaged in the internal tube groove 30d and the end edges of the legs 52d and 53d engaging on opposite sides of the lips 28d. The inner ends or corners of the legs 52d and 53d may be bent obliquely outward, as at 59 and 60 to facilitate engagement therebetween of the lips 28d. Thus, the holding member 50d may be considered as insertable sideways into the outer end of its associated tube 23d, while the U-shaped holding member 50 is insertable into the outer end of its tube 23b with the free ends of its legs 52 and 53 leading.

From the foregoing, it is seen that the present invention provides an artificial-tree construction which fully accomplishes its intended objects and is well adapted to meet practical conditions of manufacture, assembly, diassembly and use.

Although the present invention has been described in some detail by way of illustration and example for purposes of clarity of understanding, it is understood that certain changes and modifications may be made within the spirit of the invention.

What is claimed is:

1. In an artificial tree, the combination comprising an upstanding post simulating a tree trunk and having a transverse hole, an elongate connector having one end inserted in said hole, an elongate tube formed with a longitudinal slot and having one end connected to the other end of said connector to extend transversely from said post and simulate a branch, said slot being defined between a pair of flanges which are bent from the material of the tube so as to constitute radially extending lips disposed in facing spaced relation with each other, said connector including means engaging said lips to prevent undesired spreading thereof, and a plurality of artificial twigs each having its inner end region snugly engaged in said slot by said pair of lips and extending outward therefrom.

2. An artificial tree according to claim 1, said one end of said tube being open and frictionally receiving said other end of said connector.

3. An artificial tree according to claim 1, the other end of said tube being open, an additional artificial twig engaged in said other tube end, and holding means in said other tube end in holding engagement with said additional twig.

4. An artificial tree according to claim 3, said holding means comprising internal barbs in said tube in retaining engagement with said twig.

5. An artificial tree according to claim 3, said holding means comprising a member having an opening receiving said lips, to retain said member and prevent opening of said slot.

6. An artificial tree according to claim 5, said member being generally U-shaped and having one leg bifurcated to define said opening between the furcations of said one leg.

7. An artificial tree according to claim 5, said member being generally U-shaped and having spaced legs defining said opening between said legs.

8. An artificial tree according to claim 1, said one tube end being open, said other connector end being inserted into said open one tube end and including a pair of spaced portions respectively engaged on opposite sides of said lips to prevent opening of said slot.

9. An artificial tree according to claim 8, said connector comprising a pair of generally congruent facing strips fixedly secured together, the longitudinal edges of said strips at said one end of said connector extending outwardly to define outstanding longitudinal flanges for nonrotative frictional engagement in said hole.

10. An artificial tree according to claim 9, one adjacent pair of longitudinal edges of said strips at the other connector end extending outwardly to define said spaced portions.

References Cited
UNITED STATES PATENTS

| | | | |
|---|---|---|---|
| 2,111,448 | 3/1938 | Hoffman | 52—626 |
| 3,140,219 | 7/1964 | Dick et al. | 161—24 |

ROBERT F. BURNETT, Primary Examiner

R. O. LINKER, JR., Assistant Examiner